(12) United States Patent
Watanabe et al.

(10) Patent No.: US 12,137,288 B2
(45) Date of Patent: *Nov. 5, 2024

(54) IMAGING DEVICE WITH BLUR INDICATION

(71) Applicant: CANON KABUSHIKI KAISHA, Tokyo (JP)

(72) Inventors: Kazuhiro Watanabe, Tokyo (JP); Takeshi Kikkawa, Kanagawa (JP); Satoru Kobayashi, Tokyo (JP); Hiroshi Nakamura, Tokyo (JP); Akihiko Sato, Kanagawa (JP); Takeshi Nakata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,159

(22) Filed: Apr. 18, 2023

(65) Prior Publication Data

US 2023/0254578 A1 Aug. 10, 2023

Related U.S. Application Data

(63) Continuation of application No. 17/408,634, filed on Aug. 23, 2021, now Pat. No. 11,659,278.

(30) Foreign Application Priority Data

Sep. 4, 2020 (JP) ................................ 2020-149457

(51) Int. Cl.
*H04N 23/68* (2023.01)
*G06T 7/215* (2017.01)
(Continued)

(52) U.S. Cl.
CPC ....... *H04N 23/6811* (2023.01); *H04N 23/633* (2023.01); *H04N 23/64* (2023.01);
(Continued)

(58) Field of Classification Search
CPC .......... H04N 5/23254; H04N 5/23222; H04N 5/232939; H04N 5/23299; H04N 5/2259;
(Continued)

(56) References Cited

U.S. PATENT DOCUMENTS

| 10,104,277 B2 | 10/2018 | Gyotoku |
| 2009/0021576 A1* | 1/2009 | Linder ................ H04N 23/631 348/222.1 |

(Continued)

FOREIGN PATENT DOCUMENTS

| JP | 2001235782 A | 8/2001 |
| JP | 2006180471 A | 7/2006 |

(Continued)

OTHER PUBLICATIONS

Office Action issued in U.S. Appl. No. 17/408,634 mailed Jul. 21, 2022.

(Continued)

*Primary Examiner* — Christopher K Peterson
(74) *Attorney, Agent, or Firm* — ROSSI, KIMMS & McDOWELL LLP

(57) ABSTRACT

An electronic device according to the present invention, includes: a processor; and a memory storing a program which, when executed by the processor, causes the electronic device to: acquire an image by image sensing processing; set a part of the image as a specific region, wherein a position of the specific region can be changed; and detect a motion of an object included in the specific region; and perform control to display an indicator based on the detected motion of the object in a direction corresponding to a (Continued)

movement direction of the electronic device so that the indicator is superimposed and displayed at a position on the image based on the specific region.

19 Claims, 7 Drawing Sheets

(51) Int. Cl.
  *H04N 23/58* (2023.01)
  *H04N 23/60* (2023.01)
  *H04N 23/63* (2023.01)
  *H04N 23/695* (2023.01)

(52) U.S. Cl.
  CPC ........... *H04N 23/695* (2023.01); *G06T 7/215* (2017.01); *H04N 23/58* (2023.01)

(58) Field of Classification Search
  CPC ......... H04N 5/23261; H04N 5/232945; H04N 5/23218; G06T 7/215

See application file for complete search history.

(56) References Cited

U.S. PATENT DOCUMENTS

| | | | |
|---|---|---|---|
| 2012/0113267 | A1 | 5/2012 | Ishige |
| 2013/0044229 | A1* | 2/2013 | Noguchi ............. H04N 23/667 |
| | | | 348/E5.078 |
| 2013/0063605 | A1 | 3/2013 | Guan |
| 2015/0146031 | A1* | 5/2015 | Kageyama ........... H04N 25/767 |
| | | | 348/220.1 |
| 2015/0147047 | A1* | 5/2015 | Wang .................... G11B 27/02 |
| | | | 386/280 |
| 2018/0182110 | A1 | 6/2018 | Shintani |
| 2019/0082105 | A1* | 3/2019 | Yamamoto ............ H04N 23/90 |
| 2019/0394388 | A1 | 12/2019 | Takanashi |

FOREIGN PATENT DOCUMENTS

| | | |
|---|---|---|
| JP | 2011244046 A | 12/2011 |
| JP | 2012120151 A | 6/2012 |
| JP | 2016220024 A | 12/2016 |

OTHER PUBLICATIONS

Notice of Allowance issued in U.S. Appl. No. 17/408,634 mailed Jan. 19, 2023.

* cited by examiner

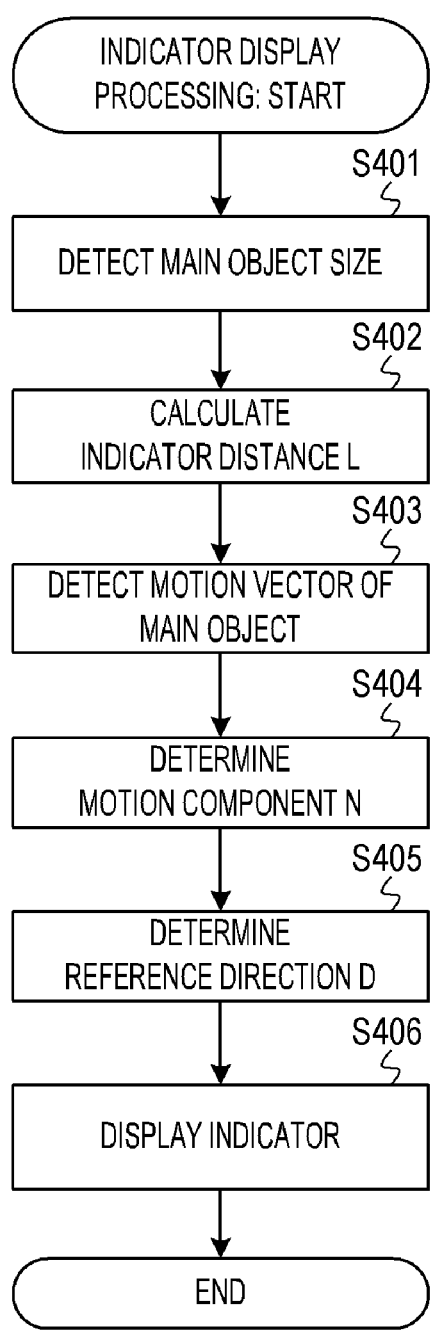

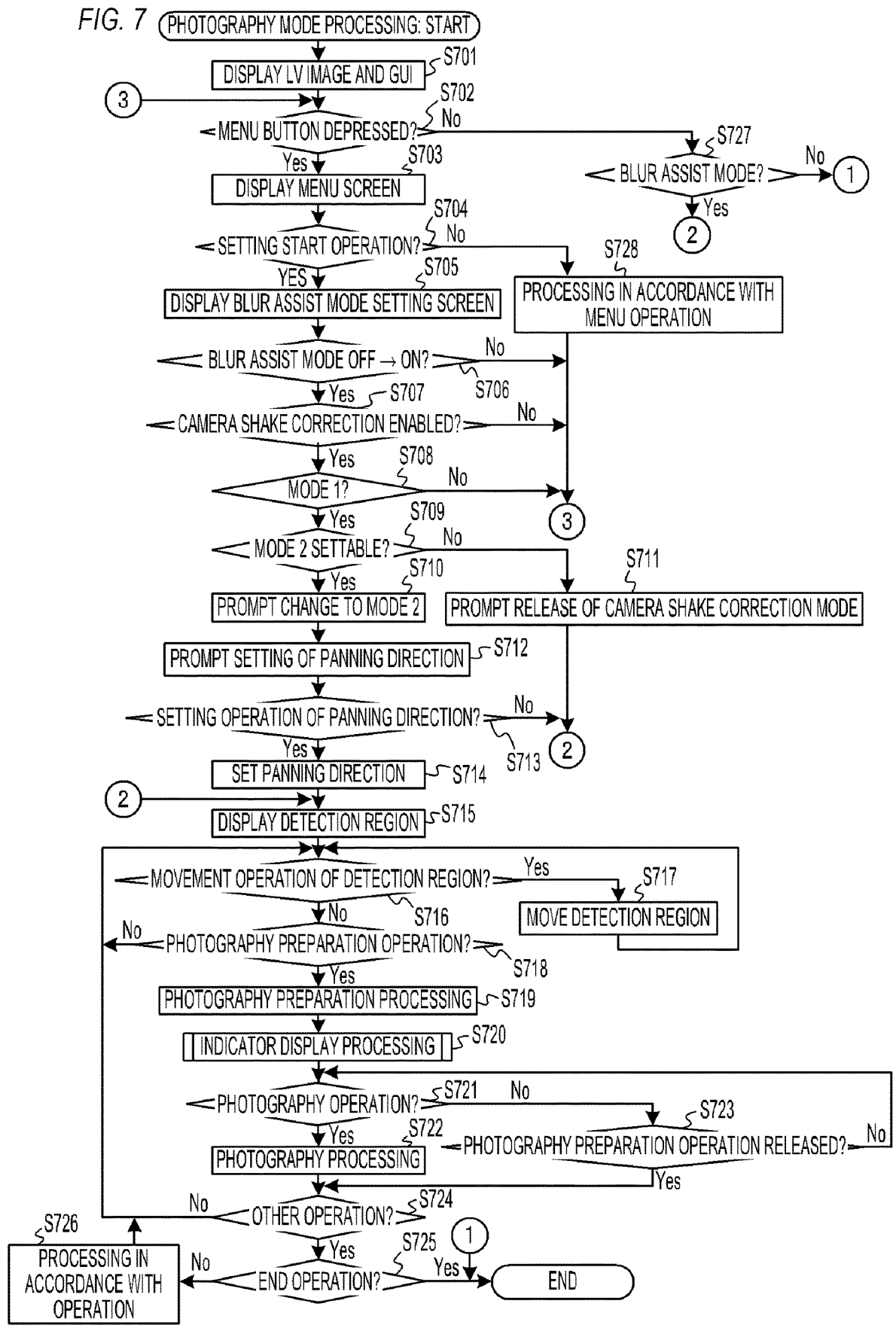

IMAGING DEVICE WITH BLUR INDICATION

BACKGROUND OF THE INVENTION

Field of the Invention

The present invention relates to an electronic device and, particularly, to a technique for assisting panning.

Description of the Related Art

One photography method of an image (a still image) that expresses a sense of speed of a moving object is panning. In panning, photography is performed at a slower shutter speed than usual while following an object (a moving body) to obtain an image in which a background flows while the object is stationary (an image in which the background blurs but the object does not). For example, a user obtains an image such as that described above by performing photography while moving (panning) a camera in accordance with a motion of the object. In this case, the shutter speed is set slower than usual based on a movement speed of the object (an exposure time is adjusted to longer than usual based on the movement speed of the object). However, when there is a difference between the movement speed of the object and a movement speed (a pan speed) of the camera by the user, the user ends up with an image in which not only the background but the object is also blurred.

Japanese Patent Application Laid-open No. 2016-220024 discloses detecting a motion (pan) of an image sensing apparatus, detecting a motion vector of an object from a video signal obtained by the image sensing apparatus during the pan, and displaying a first indicator that indicates a pan direction and a second indicator that indicates a movement direction of the object.

Japanese Patent Application Laid-open No. 2001-235782 discloses calculating an angular acceleration from an angular velocity of a camera and executing an exposure operation when the angular velocity and the angular acceleration satisfy a prescribed condition.

However, conventional art including the techniques disclosed in Japanese Patent Application Laid-open No. 2016-220024 and Japanese Patent Application Laid-open No. 2001-235782 does not enable a user to readily create a composition that captures a stationary main object at a position desired by the user.

SUMMARY OF THE INVENTION

The present invention provides a technique that enables a user to readily create a composition that captures a stationary main object at a position desired by the user.

An electronic device according to the present invention, includes: a processor; and a memory storing a program which, when executed by the processor, causes the electronic device to: acquire an image by image sensing processing; set a part of the image as a specific region, wherein a position of the specific region can be changed; and detect a motion of an object included in the specific region; and perform control to display an indicator based on the detected motion of the object in a direction corresponding to a movement direction of the electronic device so that the indicator is superimposed and displayed at a position on the image based on the specific region.

Further features of the present invention will become apparent from the following description of exemplary embodiments with reference to the attached drawings.

BRIEF DESCRIPTION OF THE DRAWINGS

FIG. 4 is a flow chart showing indicator display processing according to the first embodiment;

FIG. 7 is a flow chart showing photography mode processing according to the second embodiment.

DESCRIPTION OF THE EMBODIMENTS

External View of Digital Camera 100

Figure 1A:
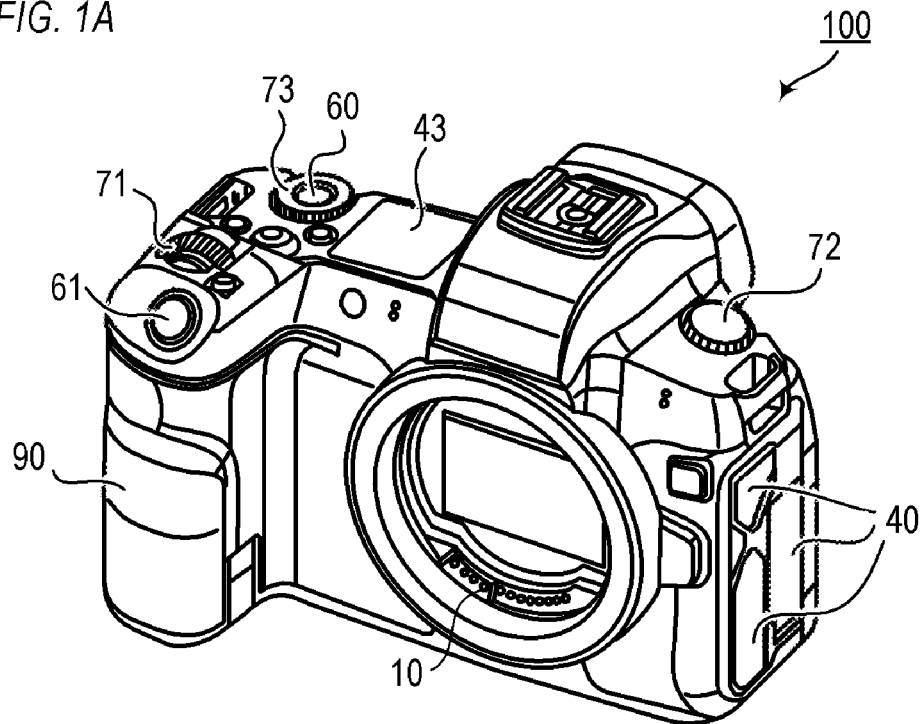
FIGS. 1A and 1B are external views of a digital camera 100.
Figure 1B:
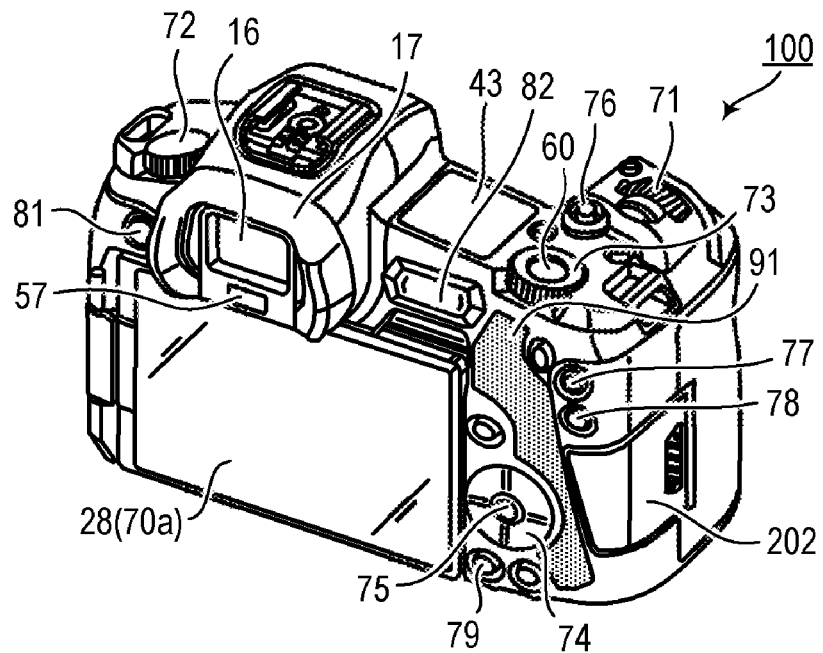

Hereinafter, preferred embodiments of the present invention will be described with reference to the drawings. FIGS. 1A and 1B show external views of a digital camera 100 as an example of an apparatus to which the present invention can be applied. FIG. 1A is a front perspective view of the digital camera 100, and FIG. 1B is a rear perspective view of the digital camera 100.

A display unit 28 is a display unit provided on a rear surface of the digital camera 100 for displaying images and various types of information. A touch panel 70a is capable of detecting touch operations with respect to a display surface (a touch operation surface) of the display unit 28. A finder outer display unit 43 is a display unit provided on an upper surface of the digital camera 100 for displaying various setting values of the digital camera 100 such as a shutter speed and an aperture. A shutter button 61 is an operating member for issuing a photograph instruction. A mode switch 60 is an operating member for switching between various modes. A terminal cover 40 is a cover for protecting a connector (not illustrated) to which is connected a connection cable or the like for connecting the digital camera 100 to an external device.

A main electronic dial 71 is a rotating operating member and, by turning the main electronic dial 71, setting values such as a shutter speed and an aperture can be changed. A power switch 72 is an operating member for switching power of the digital camera 100 on and off. A sub electronic dial 73 is a rotating operating member and, by turning the sub electronic dial 73, operations such as moving a selection frame (cursor) and image feeding can be performed. A four-way key 74 is configured such that upper, lower, left, and right portions thereof are respectively depressible, and enables processing corresponding to a depressed portion of the four-way key 74 to be performed. A SET button 75 is a push button mainly used to determine a selected item.

A moving image button 76 is used to issue instructions to start and stop moving image photography (recording). An AE lock button 77 is a push button, and by depressing the AE lock button 77 in a photography standby state, an exposure state can be fixed. An enlargement button 78 is an operation button for switching an enlargement mode on and off in a live view display (LV display) in a photography mode. By operating the main electronic dial 71 after switching on the enlargement mode, a live view image (LV image) can be enlarged or reduced. In a playback mode, the enlargement button 78 functions as an operation button for enlarging a reproduced image or increasing an enlargement rate of the reproduced image. A playback button 79 is an operation button for switching between the photography mode and the playback mode. By depressing the playback button 79 in the photography mode, a transition can be made to the playback mode and a latest image among images recorded in a recording medium 200 (to be described later) can be displayed on the display unit 28. A menu button 81 is a push button used for performing an instruction operation to display a menu screen and, when the menu button 81 is depressed, a menu screen enabling various settings to be performed is displayed on the display unit 28. The user can intuitively perform various settings using the menu screen displayed on the display unit 28 together with the four-way key 74 and the SET button 75.

A touch bar 82 (multi-function bar: M-Fn bar) is a linear touch operating member (line touch sensor) capable of accepting a touch operation. The touch bar 82 is arranged at a position where a touch operation can be performed on the touch bar 82 (where the touch bar 82 is touchable) by the thumb of a right hand gripping a grip portion 90 in a normal grip (a grip recommended by a manufacturer). The touch bar 82 is an accepting unit capable of accepting a tap operation (an operation involving touching and releasing without movement within a prescribed period of time), leftward and rightward slide operations (operations involving touching and moving a touch position while maintaining the touch), and the like with respect to the touch bar 82. The touch bar 82 is an operating member that differs from the touch panel 70a and is not equipped with a display function.

A communication terminal 10 is a communication terminal used by the digital camera 100 to communicate with a lens unit 150 (to be described later; attachable and detachable). An eyepiece 16 is an eyepiece of an eyepiece finder 17 (a look-in finder), and the user can visually confirm, via the eyepiece 16, an image displayed on an internal EVF 29 (to be described later). An eye proximity detecting unit 57 is an eye proximity detection sensor that detects whether or not an eye of the user (photographer) is approaching the eyepiece 16.

A lid 202 is a lid of a slot in which the recording medium 200 (to be described later) is stored. The grip portion 90 is a holding section configured in a shape that can be readily gripped by the user when holding the digital camera 100. The shutter button 61 and the main electronic dial 71 are arranged at positions where the shutter button 61 and the main electronic dial 71 can be operated by the index finger of the right hand in a state where the digital camera 100 is held by gripping the grip portion 90 with the little finger, the ring finger, and the middle finger of the right hand. In addition, the sub electronic dial 73 and the touch bar 82 are arranged at positions where the sub electronic dial 73 and the touch bar 82 can be operated by the right thumb in a same state. A thumb rest portion 91 (a thumb standby position) is a grip member provided at a location where the thumb of the right hand gripping the grip portion 90 can be readily placed on a rear side of the digital camera 100 in a state where none of the operating members are being operated. The thumb rest portion 91 is constituted by a rubber member or the like in order to enhance holding force (grip feeling).

Configuration Block Diagram of Digital Camera 100

Figure 2:
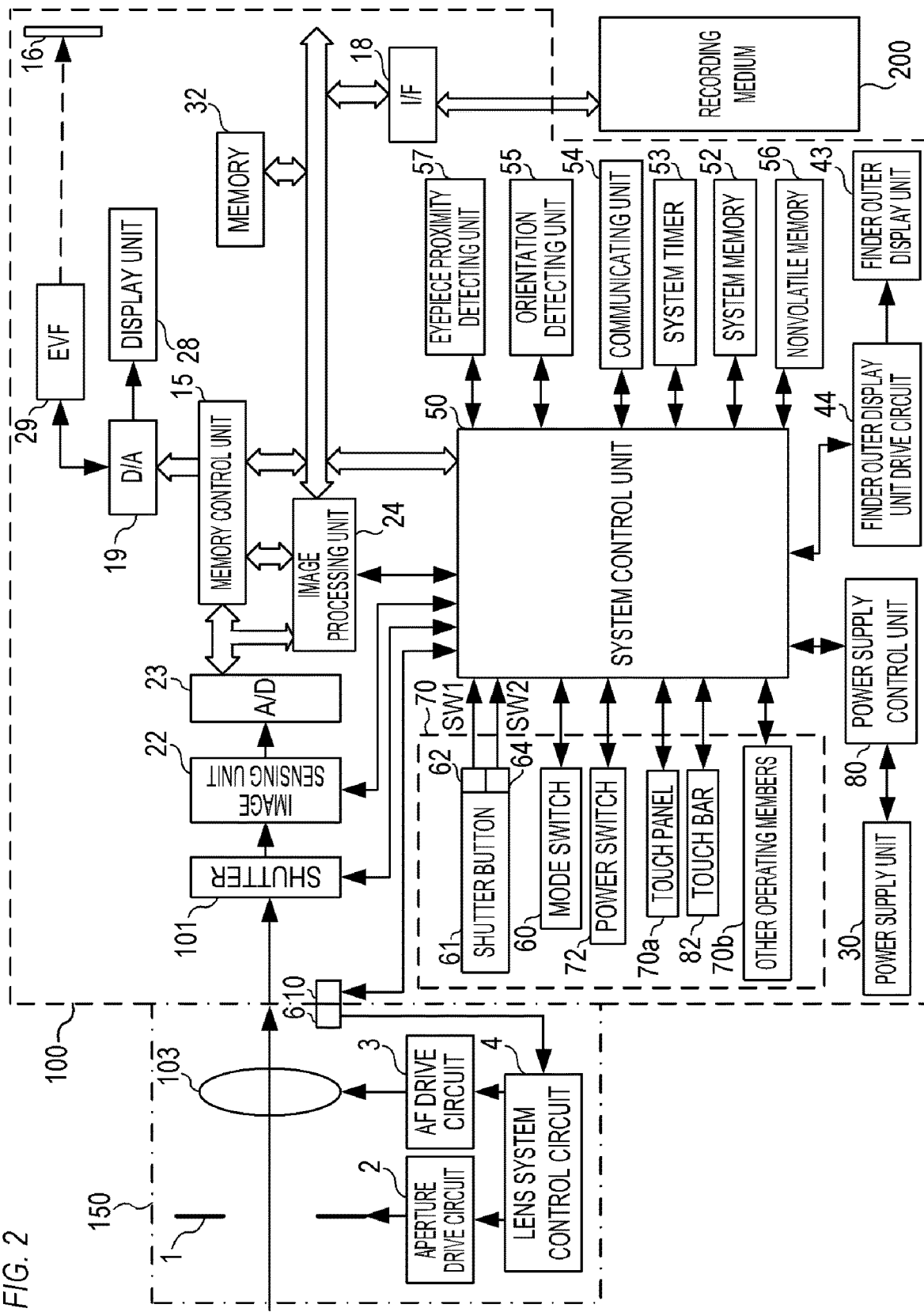
FIG. 2 is a block diagram of the digital camera 100.

FIG. 2 is a block diagram showing a configuration example of the digital camera 100. The lens unit 150 is a lens unit mounted with a replaceable photographing lens. While a lens 103 is usually configured by a plurality of lenses, in FIG. 2, the lens 103 is shown with only one lens in a simplified manner. A communication terminal 6 is a communication terminal used by the lens unit 150 to communicate with the digital camera 100, and the communication terminal 10 is a communication terminal used by the digital camera 100 to communicate with the lens unit 150. The lens unit 150 communicates with the system control unit 50 via the communication terminals 6 and 10. In addition, the lens unit 150 controls an aperture 1 via an aperture drive circuit 2 using an internal lens system control circuit 4. Furthermore, the lens unit 150 performs focusing by displacing a position of the lens 103 via an AF drive circuit 3 using the lens system control circuit 4.

A shutter 101 is a focal plane shutter capable of freely controlling an exposure time of the image sensing unit 22 under the control of the system control unit 50.

The image sensing unit 22 is an image sensing element constituted by a device such as a CCD or a CMOS which converts an optical image into an electrical signal. The image sensing unit 22 may have an image sensing surface phase difference sensor that outputs information on a defocusing amount to the system control unit 50. An A/D converter 23 converts an analog signal output from the image sensing unit 22 into a digital signal.

An image processing unit 24 performs prescribed processing (pixel interpolation, resizing processing such as reduction, color conversion processing, and the like) on data from the A/D converter 23 or data from a memory control unit 15. In addition, the image processing unit 24 performs prescribed arithmetic calculation processing using image data of a sensed image, and the system control unit 50 performs exposure control and ranging control based on an arithmetic calculation result obtained by the image processing unit 24. Accordingly, processing such as AF (automatic focusing) processing, AE (automatic exposure) processing, and EF (preliminary light emission before flash) processing in a TTL (through-the-lens) system are performed. The image processing unit 24 further performs prescribed arithmetic calculation processing using image data of a sensed image and performs AWB (automatic white balance) processing in the TTL system on the basis of an obtained arithmetic calculation result.

Output data from the A/D converter 23 is written into a memory 32 via the image processing unit 24 and the memory control unit 15. Alternatively, output data from the A/D converter 23 is written into the memory 32 via the memory control unit 15 without involving the image processing unit 24. The memory 32 stores image data obtained by the image sensing unit 22 and converted into digital data by the A/D converter 23 and image data to be displayed on the display unit 28 and the EVF 29. The memory 32 has sufficient storage capacity for storing a prescribed number of still images and a prescribed time's worth of moving images and audio.

In addition, the memory 32 also doubles as a memory (a video memory) for image display. AD/A converter 19 converts data for image display stored in the memory 32 into an analog signal and supplies the analog signal to the display unit 28 and the EVF 29. In this manner, image data for display having been written into the memory 32 is displayed by the display unit 28 and the EVF 29 via the D/A converter 19. The display unit 28 and the EVF 29 each perform display in accordance with an analog signal from the D/A converter 19 on a display such as an LCD, an organic EL, or the like. A live view display (LV) can be performed by converting digital signals subjected to A/D conversion by the A/D converter 23 and accumulated in the memory 32 into analog signals with the D/A converter 19, and sequentially transmitting the analog signals to the display unit 28 or the EVF 29 and displaying the analog signals. Hereinafter, an image displayed in live view display will be referred to as a live view image (LV image).

Various setting values of the camera including a shutter speed and an aperture are displayed on the finder outer display unit 43 via a finder outer display drive circuit 44.

A nonvolatile memory 56 is an electrically erasable and recordable memory and is, for example, an EEPROM. Constants, a program, and the like necessary for operations of the system control unit 50 are recorded in the nonvolatile memory 56. In this case, the program refers to a program for executing the various flow charts in the embodiments to be described later.

The system control unit 50 is a control unit constituted by at least one processor or one circuit and controls the entire digital camera 100. The system control unit 50 realizes the respective processing steps of the embodiments to be described later by executing the program recorded in the nonvolatile memory 56 described earlier. A system memory 52 is, for example, a RAM, and the system control unit 50 deploys constants and variables for the operations of the system control unit 50, the program read from the nonvolatile memory 56, and the like onto the system memory 52. In addition, the system control unit 50 also performs display control by controlling the memory 32, the D/A converter 19, the display unit 28, and the like.

A system timer 53 is a time-measuring unit for measuring time used in various controls and measuring time according to an internal clock.

A power supply control unit 80 is constituted by a battery detection circuit, a DC-DC converter, a switching circuit for switching between blocks to be energized, and the like, and detects whether or not a battery is mounted, a type of the battery, a remaining battery level, and the like. In addition, the power supply control unit 80 controls the DC-DC converter on the basis of the detection results and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like.

A communicating unit 54 transmits and receives video signals and audio signals to and from an external device connected wirelessly or by a wired cable. The communicating unit 54 is also capable of connecting to a wireless LAN (Local Area Network) or the Internet. In addition, the communicating unit 54 is also capable of communicating with the external device via Bluetooth (registered trademark) or Bluetooth Low Energy. The communicating unit 54 is capable of transmitting images (including LV images) sensed by the image sensing unit 22 and images recorded on the recording medium 200 and receiving image data and various other types of information from the external device.

An orientation detecting unit 55 detects an orientation of the digital camera 100 relative to a direction of gravitational force. Based on the orientation detected by the orientation detecting unit 55, a determination can be made as to whether an image photographed by the image sensing unit 22 is an image photographed while holding the digital camera 100 horizontally or an image photographed while holding the digital camera 100 vertically. The system control unit 50 can add orientation information in accordance with the orientation detected by the orientation detecting unit 55 to an image file of the image sensed by the image sensing unit 22, record a rotated version of the image, and the like. An acceleration sensor, a gyro sensor, or the like can be used as the orientation detecting unit 55. A motion (pan, tilt, uplift, whether stationary or not, and the like) of the digital camera 100 can also be detected using the acceleration sensor or the gyro sensor that constitutes the orientation detecting unit 55.

The eye proximity detecting unit 57 is an eye proximity detection sensor which detects (approach detection) an approach (eye approach) and a separation (eye separation) of an eye (object) with respect to the eyepiece 16 of the eyepiece finder 17 (hereinafter, simply referred to as a "finder"). The system control unit 50 switches between setting the display unit 28 and the EVF 29 to display (displayed state) and hide (hidden state) in accordance with the state detected by the eye proximity detecting unit 57. More specifically, at least when a current state is the photography standby state and when switching of a display destination is to be performed automatically, the display unit 28 as the display destination is set to display and the EVF 29 is set to hide when unapproached by the eye. In addition, during an eye approach, the EVF 29 as the display destination is set to display and the display unit 28 is set to hide. As the eye proximity detecting unit 57, for example, an infrared proximity sensor can be used to detect an approach of any object with respect to the eyepiece 16 of the finder 17 incorporating the EVF 29. When an object approaches, infrared light projected from a light projecting portion (not illustrated) of the eye proximity detecting unit 57 is reflected by the object and received by a light receiving portion (not illustrated) of the infrared proximity sensor. Based on an amount of received infrared light, how close the object is from the eyepiece 16 (eye proximity distance) can also be determined. In this manner, the eye proximity detecting unit 57 performs eye proximity detection in which a distance of approach by an object with respect to the eyepiece 16 is detected. An eye approach is to be detected when an object having approached the eyepiece 16 to within a prescribed distance from an eye-unapproached state (unapproached state) is detected. An eye separation is to be detected when an object of which an approach has been detected recedes to a prescribed distance or more from an eye-approached state (approached state) is detected. A threshold for detecting an eye approach and a threshold for detecting an eye separation may differ from each other by, for example, providing a hysteresis. In addition, after detecting an eye approach, an eye-approached state is assumed until an eye separation is detected. After detecting an eye separation, an eye-unapproached state is assumed until an eye approach is detected. It should be noted that an infrared proximity sensor is simply an example and other sensors may be adopted as the eye proximity detecting unit 57 as long as an approach by an eye or an object which can be regarded as an eye approach can be detected.

An operating unit 70 is an input unit for accepting an operation (a user operation) by the user and is used to input various operation instructions to the system control unit 50. As shown in FIG. 2, the operating unit 70 includes the mode switch 60, the shutter button 61, the power switch 72, the touch panel 70a, and the touch bar 82. As other operating members 70b, the operating unit 70 includes the main electronic dial 71, the sub electronic dial 73, the four-way key 74, the SET button 75, the moving image button 76, the AE lock button 77, the enlargement button 78, the playback button 79, and the menu button 81.

The mode switch 60 switches an operating mode of the system control unit 50 to any of a still image photography mode, a moving image photography mode, a playback mode, and the like. Modes included in the still image photography mode are an automatic photography mode, an automatic scene determination mode, a manual mode, an aperture priority mode (Av mode), a shutter speed priority mode (Tv mode), and a program AE mode (P mode). Other available modes include various scene modes that constitute photography settings for different photography scenes as well as custom modes. Using the mode switch 60, the user can directly switch to any of these modes. Alternatively, after temporarily switching to a photography mode list screen using the mode switch 60, another operating member may be used to selectively switch to any of a plurality of displayed modes. In a similar manner, the moving image photography mode may also include a plurality of modes.

The shutter button 61 includes a first shutter switch 62 and a second shutter switch 64. The first shutter switch 62 is turned on during an operation of the shutter button 61 by a so-called half-press (a photography preparation instruction) and generates a first shutter switch signal SW1. In accordance with the first shutter switch signal SW1, the system control unit 50 starts a photography preparation operation of AF (automatic focus) processing, AE (automatic exposure) processing, AWB (automatic white balance) processing, EF (preliminary light emission before flash) processing, and the like. The second shutter switch 64 is turned on upon completion of an operation of the shutter button 61 by a so-called full-press (a photography instruction) and generates a second shutter switch signal SW2. In accordance with the second shutter switch signal SW2, the system control unit 50 starts a series of operations of photography processing from reading a signal from the image sensing unit 22 to writing a sensed image into the recording medium 200 as an image file.

The touch panel 70a and the display unit 28 can be integrally constructed. For example, the touch panel 70a is configured such that transmittance of light does not obstruct display by the display unit 28 and is mounted to an upper layer of a display surface of the display unit 28. Subsequently, an input coordinate on the touch panel 70a and a display coordinate on the display surface of the display unit 28 are associated with each other. Accordingly, a GUI (graphical user interface) can be provided which enables the user to feel as if a screen displayed on the display unit 28 can be directly manipulated. The system control unit 50 is capable of detecting the following operations with respect to the touch panel 70a or the following states of the touch panel 70a.

A new touch on the touch panel 70a by a finger or a stylus previously not in touch with the touch panel 70a or, in other words, a start of a touch (hereinafter referred to as a touch-down)

A state where the touch panel 70a is being touched by a finger or a stylus (hereinafter referred to as a touch-on)

A state where a finger or a stylus is moving while in touch with the touch panel 70a (hereinafter referred to as a touch-move)

A separation (release) from the touch panel 70a by a finger or a stylus having been in touch with the touch panel 70a or, in other words, an end of a touch (hereinafter referred to as a touch-up)

A state where nothing is touching the touch panel 70a (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger or a stylus touches the touch panel 70a through an internal bus. In addition, based on the notified information, the system control unit 50 determines what kind of operation (touch operation) has been performed on the touch panel 70a. With respect to a touch-move, a movement direction of a finger or a stylus moving on the touch panel 70a can be determined for each of a vertical component and a horizontal component on the touch panel 70a on the basis of a change in the position coordinate. When a touch-move of a prescribed distance or more is detected, it is determined that a slide operation has been performed. An operation involving quickly moving a finger on the touch panel 70a for a certain distance while keeping the finger in touch with the touch panel 70a and then releasing the finger is referred to as a flick. In other words, a flick is an operation in which a finger quickly traces the touch panel 70a as though flicking on the touch panel 70a. A determination that a flick has been performed can be made (a determination that a flick has occurred following a slide operation can be made) when a detection of a touch-move of a prescribed distance or more at a prescribed speed or more is followed by a detection of a touch-up. Furthermore, a touch operation involving touching (multi-touching) a plurality of locations (for example, two points) at the same time and bringing the respective touch positions close to each other is referred to as a pinch-in while a touch operation in which the respective touch positions are distanced from each other is referred to as a pinch-out. A pinch-out and a pinch-in are collectively referred to as a pinch operation (or, simply, a pinch). The touch panel 70a may adopt any touch panel system among various systems including a resistive film system, a capacitance system, a surface acoustic wave system, an infrared system, an electromagnetic induction system, an image recognition system, and an optical sensor system. Any of a system in which a touch is detected when contact is made with the touch panel and a system in which a touch is detected when a finger or a stylus approaches the touch panel may be adopted.

In addition, the system control unit 50 is capable of detecting the following operations to the touch bar 82 or the following states of the touch bar 82.

A new touch on the touch bar 82 by a finger or a stylus previously not in touch with the touch bar 82 or, in other words, a start of a touch (hereinafter referred to as a touch-down)

A state where the touch bar 82 is being touched by a finger or a stylus (hereinafter referred to as a touch-on)

A finger moving while in touch with the touch bar 82 (hereinafter referred to as a touch-move)

A separation (release) from the touch bar 82 by a finger or a stylus previously in touch with the touch bar 82 or, in other words, an end of a touch (hereinafter referred to as a touch-up)

A state where nothing is touching the touch bar 82 (hereinafter referred to as a touch-off)

When a touch-down is detected, a touch-on is simultaneously detected. Normally, after a touch-down, a touch-on is continuously detected unless a touch-up is detected. When a touch-move is detected, a touch-on is similarly simultaneously detected. Even when a touch-on is detected, a touch-move is not detected unless a touch position moves. A touch-off occurs after a touch-up is detected for all of the fingers or a stylus previously in touch.

The system control unit 50 is notified of the operations and states described above as well as a position coordinate where a finger touches the touch bar 82 through an internal bus and, based on the notified information, the system control unit 50 determines what kind of operation (touch operation) has been performed on the touch bar 82. With respect to a touch-move, a movement in a horizontal direction (left-right direction) on the touch bar 82 is detected. When a movement of a touch position by a prescribed distance or more (a movement of a prescribed amount or more) is detected, it is determined that a slide operation has been performed. A determination that a tap operation has been performed is to be made when an operation is performed in which the touch bar 82 is touched by a finger and the touch is released within a prescribed period of time without performing a slide operation. The touch bar 82 may adopt any touch sensor system among various systems including a resistive film system, a capacitance system, a surface acoustic wave system, an infrared system, an electromagnetic induction system, an image recognition system, and an optical sensor system.

First Embodiment

Figure 3:
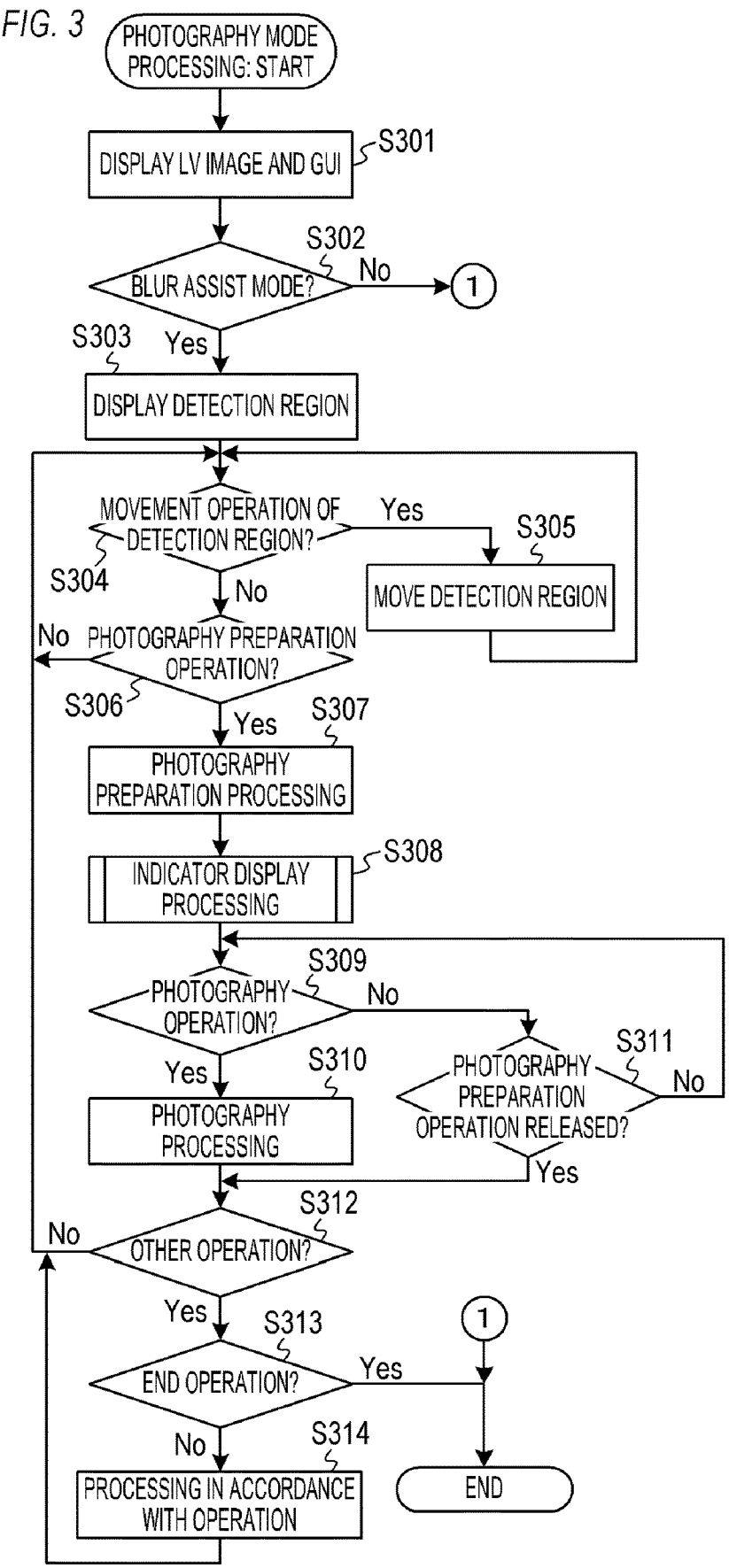
FIG. 3 is a flow chart showing photography mode processing according to a first embodiment.

A first embodiment of the present invention will be described. FIG. 3 is a flow chart showing details of photography mode processing performed in the digital camera 100 according to the first embodiment. The processing is realized as the system control unit 50 deploys a program recorded in the nonvolatile memory 56 on the system memory 52 and executes the program. The processing shown in FIG. 3 is started when the digital camera 100 is activated in a photography mode or the system control unit 50 switches to the photography mode. The digital camera 100 repetitively performs the processing shown in FIG. 3 during the photography mode.

In S301, the system control unit 50 displays an LV image and a GUI such as an icon representing a setting state of the digital camera 100 on the display unit 28.

In S302, the system control unit 50 determines whether or not a blur assist mode is ON (enabled). When the blur assist mode is ON, the system control unit 50 advances to S303, but otherwise the photography mode processing is ended. The blur assist mode is a mode for assisting panning.

In S303, the system control unit 50 displays a detection region (a specific region set in a part of a sensed image) that is an object region in which blur detection is to be performed on the display unit 28.

In S304, the system control unit 50 determines whether or not a movement operation of the detection region (an operation of instructing to move the detection region; an operation of instructing to change a position of the detection region) has been performed. When a movement operation of the detection region has been performed, the system control unit 50 advances to S305, but otherwise the system control unit 50 advances to S306. As the movement operation, an operation using the four-way key 74 or an operation using the touch panel 70a is conceivable. For example, the system control unit 50 can determine that a movement operation has been performed when detecting "a touch-move involving touching the detection region (the touch panel 70a) and moving a touch position".

In S305, the system control unit 50 moves and displays the detection region on the display unit 28 in accordance with the movement operation.

In S306, the system control unit 50 determines whether or not a photography preparation operation (a photography preparation instruction; a half-press on the shutter button 61 or the like) has been performed. When a photography preparation operation has been performed, the system control unit 50 advances to S307, but otherwise the system control unit 50 advances to S304.

In S307, the system control unit 50 performs photography preparation processing (a photography preparation operation) such as AF (automatic focusing) processing, AE (automatic exposure) processing, AWB (automatic white balance) processing, or EF (preliminary light emission before flash) processing.

In S308, the system control unit 50 displays one or more indicators for assisting panning on the display unit 28 (indicator display processing). Details of the indicator display processing will be described later with reference to FIG. 4.

In S309, the system control unit 50 determines whether or not a photography operation (a photography instruction; a full-press on the shutter button 61) has been performed. When a photography operation has been performed, the system control unit 50 advances to S310, but otherwise the system control unit 50 advances to S311.

In S310, the system control unit 50 performs a series of photography processing from reading a signal from the image sensing unit 22 to writing a sensed image into the recording medium 200 as an image file.

In S311, the system control unit 50 determines whether or not the photography preparation operation has been released. When the photography preparation operation has been released, the system control unit 50 advances to S312, but otherwise the system control unit 50 advances to S309.

In S312, the system control unit 50 determines whether or not another operation (instruction) has been performed. When another operation has been performed, the system control unit 50 advances to S313, but otherwise the system control unit 50 advances to S304.

In S313, the system control unit 50 determines whether or not the operation in S312 is an end operation (an end instruction) of photography mode processing. When the operation is an end operation, the system control unit 50 ends the photography mode processing, but otherwise the system control unit 50 advances to S314. For example, the system control unit 50 determines that an end operation of the photography mode processing has been performed when an operation of turning off power of the digital camera 100 has been performed and ends the photography mode processing.

In S314, the system control unit 50 performs processing in accordance with the operation in S312.

FIG. 4 is a flow chart showing details of the indicator display processing in S308 shown in FIG. 3. The processing is realized as the system control unit 50 deploys a program recorded in the nonvolatile memory 56 on the system memory 52 and executes the program.

In S401, the system control unit 50 detects an object (a main object) present in the detection region from a sensed image (an LV image) and, based on a detection result of the main object, detects a size of the main object in the image (a size of the main object on the display unit 28). The main object can be detected by various proposed methods. The size of the main object (a main object size) is, for example, an area (a total number of pixels), a width, a height, or the like of the main object. An area (a total number of pixels), a width, a height, or the like of a rectangle circumscribing the main object may be used as the size of the main object.

In S402, the system control unit 50 determines an indicator distance L in accordance with the main object size detected in S401. The indicator distance L corresponds to a distance (an interval) from the detection region to an indicator and, in the first embodiment, a distance in a horizontal direction or a vertical direction. For example, the indicator distance L corresponds to a distance from a center of the detection region to the indicator. In the first embodiment, in order to suppress a situation where the indicator overlaps with and obscures the main object, the system control unit 50 determines a longer indicator distance L when the main object size is larger. It should be noted that the indicator distance L may correspond to a distance (a shortest distance) between an end of the detection region to the indicator or the like. The indicator distance L may be a fixed value.

In S403, based on the LV image, the system control unit 50 detects a motion vector of the main object (detected in S401) in the LV image. For example, a motion vector is detected by performing pattern matching of two images sensed at different time points such as a present image and an immediately previous image (an image of a field (frame) that immediately precedes the present field).

In S404, the system control unit 50 determines, as a motion component N, a horizontal component or a vertical component of the motion vector (which corresponds to a blur of the main object in a photographed (recorded) image) detected in S403. For example, when the horizontal component (a component in the horizontal direction) of the motion vector is larger than the vertical component (a component in the vertical direction) of the motion vector, the system control unit 50 determines the horizontal component of the motion vector as the motion component N. When the vertical component of the motion vector is larger than the horizontal component of the motion vector, the system control unit 50 determines the vertical component of the motion vector as the motion component N. The system control unit 50 may detect a movement direction of the digital camera 100 (an image sensing apparatus) using the orientation detecting unit 55 and determine a component of the motion vector in a direction corresponding to the movement direction as the motion component N. For example, when the movement direction of the digital camera 100 is closer to the horizontal direction than the vertical direction, the system control unit 50 may determine the horizontal component of the motion vector as the motion component N. When the movement direction of the digital camera 100 is closer to the vertical direction than the horizontal direction, the system control unit 50 may determine the vertical component of the motion vector as the motion component N. The motion component N is used to determine a position of a blur indicator (an indicator that indicates, as a position, a blur (a magnitude and a direction) of the main object in a photographed (recorded) image). In the first embodiment, the motion component N is also used to determine a form of the blur indicator (the number of constituent elements, a color, or the like of the blur indicator).

In S405, the system control unit 50 determines a direction perpendicular to the direction of the motion component N determined in S404 as a reference direction D that is a direction of a straight line indicating a reference position of the blur indicator (a position in order to photograph (record) an image in a state where the main object is not blurred). For example, when the horizontal component of the motion vector is larger than the vertical component of the motion vector, the system control unit 50 determines the vertical direction as the reference direction D. When the vertical component of the motion vector is larger than the horizontal component of the motion vector, the system control unit 50 determines the horizontal direction as the reference direction D. The system control unit 50 may determine a direction perpendicular to the direction corresponding to the movement direction of the digital camera 100 as the reference direction D. For example, when the movement direction of the digital camera 100 is closer to the horizontal direction than the vertical direction, the system control unit 50 may determine the vertical direction as the reference direction D. When the movement direction of the digital camera 100 is closer to the vertical direction than the horizontal direction, the system control unit 50 may determine the horizontal direction as the reference direction D.

In S406, based on the determined indicator distance L, the motion component N, and the reference direction D, the system control unit 50 displays one or more indicators at least including the blur indicator. Although details will be given later, in the first embodiment, a position on a straight line in the reference direction D that passes through the center of the detection region is adopted as a reference position for photographing (recording) an image in a state where the main object in the detection region has no blur in a direction perpendicular to the reference direction D. In addition, a degree of blur is indicated by a position of the blur indicator with respect to the reference position.

While the direction of the motion component N and the reference direction D are described as being the horizontal direction or the vertical direction in the first embodiment, the direction of the motion component N and the reference direction D are not limited thereto. For example, the system control unit 50 may determine the motion vector detected in S403 as the motion component N and determine a direction perpendicular to the motion vector as the reference direction D. The system control unit 50 may determine a component of the motion vector in the movement direction of the digital camera 100 as the motion component N and determine a direction perpendicular to the movement direction of the digital camera 100 as the reference direction D.

FIGS. 5A to 5F are diagrams showing display examples (display examples in S406 shown in FIG. 4) on the display unit 28. In FIGS. 5A to 5F, LV images capturing a main object 501 and a background object 506 are being displayed. The LV image is displayed in S301 shown in FIG. 3. In the real world, the main object 501 is moving while the background object 506 is stationary. A case where a pan (a movement in a left-right direction (horizontal direction)) or a tilt (a movement in an up-down direction (vertical direction)) of the digital camera 100 is performed in order to keep the main object 501 at a constant position during panning will now be considered. When panning is performed successfully, the main object 501 is relatively stationary with respect to a photography range that changes due to the pan or the tilt while the background object 506 relatively moves with respect to an image sensing range. As a result, an image is obtained in which the main object 501 does not blur but the background object 506 blurs in a panning direction (a direction of the pan or the tilt).

An icon 511 represents a type of a photography mode icon and is an icon indicating that the photography mode of the digital camera 100 is set to a blur assist mode. An icon 512 is an AF mode icon indicating that a focus mode of the digital camera 100 is set to an AF mode (automatic focusing mode). An icon 513 represents a type of a display item indicating photographic settings (photographing conditions) to which the digital camera 100 is configured and indicates presently-set image quality settings (the number of recording pixels and a compression ratio). The icons 511 to 513 are also displayed in S301 shown in FIG. 3. In addition to the icons 511 to 513, other information related to the photographic settings may be displayed.

As shown in FIGS. 5A to 5F, the system control unit 50 displays a detection region 502 (an item indicating a detection region such as a frame indicating the detection region) that is an object region in which blur detection is to be performed by superimposing the detection region 502 on the LV image. The detection region 502 is displayed in S303 shown in FIG. 3. The detection region 502 is displayed at a position arbitrarily designated by the user (an initial position is center). The user designates (sets) the position of the detection region 502 in advance so that a composition intended by the user is created and pans or tilts the digital camera 100 so that the main object 501 is captured in the detection region 502. Displaying the detection region 502 makes it easier for the user to capture the main object 501 according to the composition intended by the user.

In FIGS. 5A to 5F, an indicator 503 is a blur indicator that indicates, as a position, a blur (a magnitude and a direction) of the main object 501 in a photographed (recorded) image. An indicator 504 is a horizontal reference indicator that indicates the center of the detection region 502 in the horizontal direction and an indicator 505 is a vertical reference indicator that indicates the center of the detection region 502 in the vertical direction. The blur indicator 503, the horizontal reference indicator 504, and the vertical reference indicator 505 are displayed in S406 shown in FIG. 4.

In the example shown in FIGS. 5A to 5F, the blur indicator 503, the horizontal reference indicator 504, and the vertical reference indicator 505 are displayed outside the detection region 502. Specifically, the blur indicator 503 is displayed at a position separated by a blur indicator distance from the center of the detection region 502 in the horizontal direction or the vertical direction. The horizontal reference indicator 504 is displayed at a position separated by a reference indicator distance from the center of the detection region 502 in the vertical direction. The vertical reference indicator 505 is displayed at a position separated by the reference indicator distance from the center of the detection region 502 in the horizontal direction. A longer distance than the reference indicator distance is set as the blur indicator distance so that the blur indicator 503 does not overlap with the horizontal reference indicator 504 and the vertical reference indicator 505. The reference indicator distance and the blur indicator distance are distances in accordance with the indicator distance L (longer distances when the indicator distance L is longer such as distances proportional to the indicator distance L). Therefore, determining the indicator distance L is equivalent to determining the reference indicator distance and the blur indicator distance. By displaying the blur indicator 503, the horizontal reference indicator 504, and the vertical reference indicator 505 in this manner, a situation where the indicators overlap with the main object 501 and obscure the main object 501 can be suppressed. It should be noted that the reference indicator distance or the blur indicator distance may or may not be the same as the indicator distance L.

In addition, in the example shown in FIGS. 5A to 5F, a constituent element of the blur indicator 503 is a line segment and the blur indicator 503 is constituted by one or more line segments. The horizontal reference indicator 504 is a single line segment that is parallel to the vertical direction and the vertical reference indicator 505 is a single line segment that is parallel to the horizontal direction.

Figure 5A:
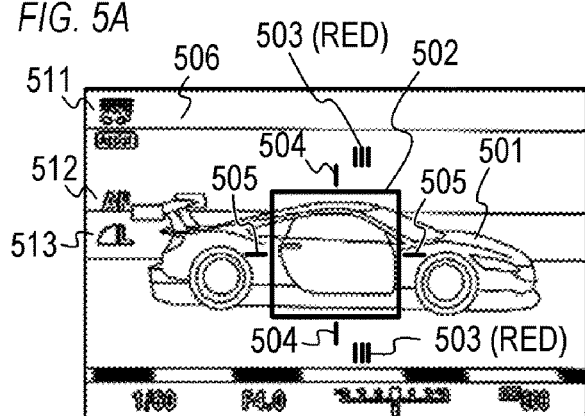
FIGS. 5A to 5F are diagrams showing a display example of an indicator according to the first embodiment.
Figure 5D:
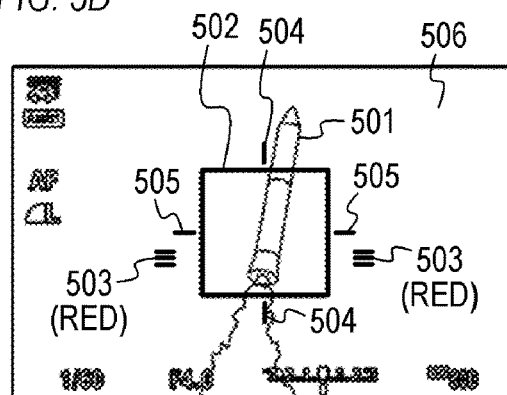
Figure 5B:
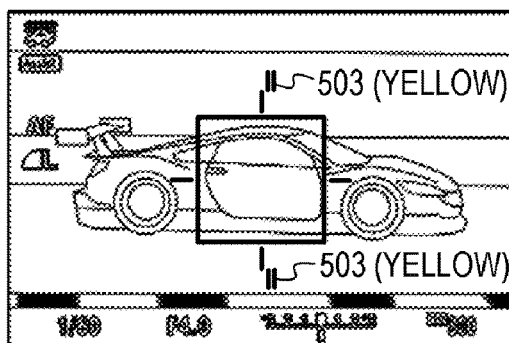
Figure 5E:
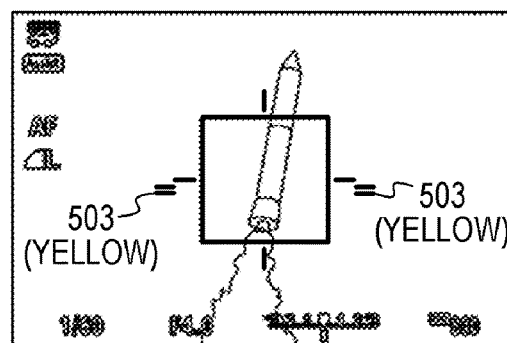
Figure 5C:
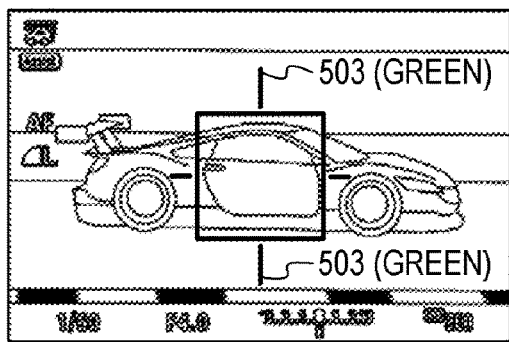

FIGS. 5A to 5C show a display example of a state in the real world where an automobile moving in a transverse direction (rightward) is the main object 501 and panning is performed while moving (panning) the digital camera 100 in the transverse direction (rightward) in accordance with a movement direction of the main object 501.

FIG. 5A shows a display example of a state where the vertical direction is determined as the reference direction D and a movement speed (a pan speed) of the digital camera 100 is slower than a movement speed of the main object 501. As shown in FIG. 5A, when the reference direction D is the vertical direction, the constituent element of the blur indicator 503 is a line segment that is parallel to the vertical direction (the horizontal reference indicator 504). In addition, the blur indicator 503 is displayed at a position separated by the blur indicator distance from the center of the detection region 502 in the vertical direction. In this case, a horizontal position (a position in the horizontal direction) of the horizontal reference indicator 504 is a reference position for photographing (recording) an image in a state where the main object 501 has no blur in the horizontal direction.

In the state shown in FIG. 5A, since the movement speed of the digital camera 100 is slower than the movement speed of the main object 501, an image in which the main object 501 is blurred to the right is photographed (recorded). Therefore, as shown in FIG. 5A, the blur indicator 503 is displayed on a right side (a same side as a direction of blur of the main object 501) of the horizontal reference indicator 504. A horizontal distance (a distance in the horizontal direction) between the blur indicator 503 and the horizontal reference indicator 504 corresponds to a magnitude of the blur of the main object 501 and is determined in accordance with an absolute value of the motion component N (a horizontal component of the motion vector of the main object 501 in the LV image). For example, like a distance that is proportional to the absolute value of the motion component N, the larger the absolute value of the motion component N, the longer the distance determined as the horizontal distance between the blur indicator 503 and the horizontal reference indicator 504. Whether the blur indicator 503 is displayed on the right side or displayed on the left side of the horizontal reference indicator 504 is determined in accordance with a sign (+/−) of the motion component N.

In addition, since a difference between the movement speed of the digital camera 100 and the movement speed of the main object 501 is large, the blur indicator 503 is made up of three constituent elements (line segments) and a color of the blur indicator 503 is red. The number of the constituent elements (line segments) of the blur indicator 503 and the color of the blur indicator 503 also correspond to the magnitude of the blur of the main object 501 and are determined in accordance with the absolute value of the motion component N. For example, the number of the constituent elements of the blur indicator 503 is determined so that the blur indicator 503 has one constituent element when the absolute value of the motion component N is equal to or smaller than a threshold A, two constituent elements when the absolute value of the motion component N is larger than the threshold A and equal to or smaller than a threshold B (>threshold A), and three constituent elements when the absolute value of the motion component N is larger than the threshold B. In addition, the color of the blur indicator 503 is determined so that the blur indicator 503 is green when the absolute value of the motion component N is equal to or smaller than the threshold A, yellow when the absolute value of the motion component N is larger than the threshold A and equal to or smaller than the threshold B, and red when the absolute value of the motion component N is larger than the threshold B. The color of the horizontal reference indicator 504 and the color of the vertical reference indicator 505 may be fixed or may be changed to same colors as the blur indicator 503.

Based on a display (the position, the number of constituent elements, the color, and the like of the blur indicator 503) shown in FIG. 5A, the user can readily comprehend that a large rightward blur occurs on the main object 501 in an image to be photographed (recorded). In addition, the user can increase the movement speed of the digital camera 100 so as to reduce the magnitude of the blur of the main object 501.

FIG. 5B shows a display example of a state where the movement speed of the digital camera 100 has been increased from the state shown in FIG. 5A. Even in the state shown in FIG. 5B, since the movement speed of the digital camera 100 is slower than the movement speed of the main object 501, an image in which the main object 501 is blurred to the right is to be photographed (recorded). Therefore, as shown in FIG. 5B, the blur indicator 503 is displayed on the right side of the horizontal reference indicator 504. However, in the state shown in FIG. 5B, the movement speed of the digital camera 100 has been brought closer to the movement speed of the main object 501 from the state shown in FIG. 5A. Therefore, compared to FIG. 5A, the blur indicator 503 is displayed at a position closer to the horizontal reference indicator 504. In addition, the blur indicator 503 is made up of two constituent elements and the color of the blur indicator 503 is yellow.

Based on a display (the position, the number of constituent elements, the color, and the like of the blur indicator 503) shown in FIG. 5B, the user can readily comprehend that a moderate amount of rightward blur occurs on the main object 501 in an image to be photographed (recorded). In addition, the user can further increase the movement speed of the digital camera 100 so as to further reduce the amount of blur of the main object 501.

FIG. 5C shows a display example of a state where the movement speed of the digital camera 100 has been further increased from the state shown in FIG. 5B. In the state shown in FIG. 5C, since the movement speed of the digital camera 100 has become equal to the movement speed of the main object 501, an image in which the main object 501 is captured in the detection region 502 and the main object 501 has no blur can be photographed (recorded). Therefore, as shown in FIG. 5C, the blur indicator 503 is displayed at a horizontal position equal to that of the horizontal reference indicator 504. In addition, the blur indicator 503 is made up of one constituent element and the color of the blur indicator 503 is green.

Based on a display (the position, the number of constituent elements, the color, and the like of the blur indicator 503) shown in FIG. 5C, the user can readily comprehend that the main object 501 will not be blurred and will be captured in the detection region 502 (panning will be successful) in an image to be photographed (recorded). In addition, the user can maintain the movement speed of the digital camera 100 so as to maintain the present state (photographic opportunity).

Figure 5F:
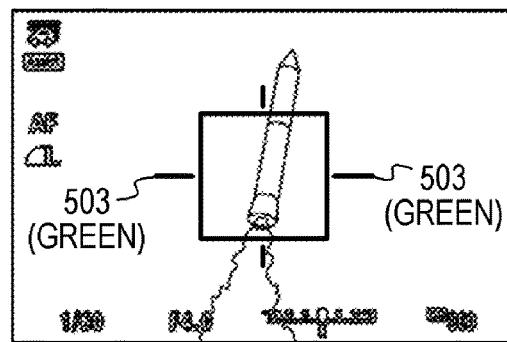

FIGS. 5D to 5F show a display example of a state in the real world where a rocket moving in a longitudinal direction (upward) is the main object 501 and panning is performed while moving (tilting) the digital camera 100 in the longitudinal direction (upward) in accordance with a movement direction of the main object 501.

FIG. 5D shows a display example of a state where the horizontal direction is determined as the reference direction D and a movement speed (a tilt speed) of the digital camera 100 is faster than a movement speed of the main object 501. As shown in FIG. 5D, when the reference direction D is the horizontal direction, the constituent element of the blur indicator 503 is a line segment that is parallel to the horizontal direction (the vertical reference indicator 505). In addition, the blur indicator 503 is displayed at a position separated by the blur indicator distance from the center of the detection region 502 in the horizontal direction. In this case, a vertical position (a position in the vertical direction) of the vertical reference indicator 505 is a position for photographing (recording) an image in a state where the main object 501 has no blur in the vertical direction.

In the state shown in FIG. 5D, since the movement speed of the digital camera 100 is faster than the movement speed of the main object 501, an image in which the main object 501 is blurred downward is photographed (recorded). Therefore, as shown in FIG. 5D, the blur indicator 503 is displayed on a lower side (a same side as a direction of blur of the main object 501) of the vertical reference indicator 505. A vertical distance (a distance in the vertical direction) between the blur indicator 503 and the vertical reference indicator 505 corresponds to a magnitude of the blur of the main object 501 and is determined in accordance with an absolute value of the motion component N (a vertical component of the motion vector of the main object 501 in the LV image). For example, like a distance that is proportional to the absolute value of the motion component N, the larger the absolute value of the motion component N, the longer the distance determined as the vertical distance between the blur indicator 503 and the vertical reference indicator 505. Whether the blur indicator 503 is displayed on the lower side or displayed on the upper side of the vertical reference indicator 505 is determined in accordance with a sign (+/−) of the motion component N.

In addition, since a difference between the movement speed of the digital camera 100 and the movement speed of the main object 501 is large, the blur indicator 503 is made up of three constituent elements (line segments) and a color of the blur indicator 503 is red.

Based on a display (the position, the number of constituent elements, the color, and the like of the blur indicator 503) shown in FIG. 5D, the user can readily comprehend that a large downward blur occurs on the main object 501 in an image to be photographed (recorded). In addition, the user can reduce the movement speed of the digital camera 100 so as to reduce the magnitude of the blur of the main object 501.

FIG. 5E shows a display example of a state where the movement speed of the digital camera 100 has been reduced from the state shown in FIG. 5D. Even in the state shown in FIG. 5E, since the movement speed of the digital camera 100 is faster than the movement speed of the main object 501, an image in which the main object 501 is blurred downward is photographed (recorded). Therefore, as shown in FIG. 5E, the blur indicator 503 is displayed on the lower side of the vertical reference indicator 505. However, in the state shown in FIG. 5E, the movement speed of the digital camera 100 has been brought closer to the movement speed of the main object 501 from the state shown in FIG. 5D. Therefore, compared to FIG. 5D, the blur indicator 503 is displayed at a position closer to the vertical reference indicator 505. In addition, the blur indicator 503 is made up of two constituent elements and the color of the blur indicator 503 is yellow.

Based on a display (the position, the number of constituent elements, the color, and the like of the blur indicator 503) shown in FIG. 5E, the user can readily comprehend that a moderate amount of downward blur occurs on the main object 501 in an image to be photographed (recorded). In addition, the user can further reduce the movement speed of the digital camera 100 so as to further reduce the amount of blur of the main object 501.

FIG. 5F shows a display example of a state where the movement speed of the digital camera 100 has been further reduced from the state shown in FIG. 5E. In the state shown in FIG. 5F, since the movement speed of the digital camera 100 has become equal to the movement speed of the main object 501, an image in which the main object 501 is captured in the detection region 502 and the main object 501 has no blur is photographed (recorded). Therefore, as shown in FIG. 5F, the blur indicator 503 is displayed at a vertical position equal to that of the vertical reference indicator 505. In addition, the blur indicator 503 is made up of one constituent element and the color of the blur indicator 503 is green.

Based on a display (the position, the number of constituent elements, the color, and the like of the blur indicator 503) shown in FIG. 5F, the user can readily comprehend that the main object 501 will not be blurred and will be captured in the detection region 502 (panning will be successful) in an image to be photographed (recorded). In addition, the user can maintain the movement speed of the digital camera 100 so as to maintain the present state (photographic opportunity).

According to the first embodiment described above, the user can change a detection region to be an object of blur detection. In addition, a position on a straight line in the reference direction D that passes through the center of the detection region is shown as a reference position for photographing (recording) an image in a state where the main object in the detection region has no blur in a direction perpendicular to the reference direction D. Furthermore, a magnitude and a direction of a blur of the main object detected in the detection region are indicated by the number of line segments constituting the blur indicator, a position of the blur indicator with respect to a reference position of the line segments, and a color of the line segments. Accordingly, by checking the blur indicator together with an LV image, the user can readily create a composition in which the main object is captured while being stationary at a position desired by the user. Consequently, the user can readily perform panning in a specific composition.

In addition, according to the first embodiment, a detection region, a horizontal reference indicator, and a vertical reference indicator are displayed and a form (for example, at least one of the number and a color of constituent elements) of a blur indicator are changed in accordance with a magnitude of a blur of the main object. Accordingly, the user can more readily create a desired composition while further checking the detection region, the horizontal reference indicator, the vertical reference indicator, and the form of the blur indicator.

Furthermore, according to the first embodiment, the blur indicator, the horizontal reference indicator, and the vertical reference indicator are displayed outside the detection region. Accordingly, the indicators can be prevented from overlapping with the main object 501 to obscure the main object 501 and the user can more readily create a desired composition.

Second Embodiment

A second embodiment of the present invention will be described. In the first embodiment, an example has been described in which the reference direction D is determined based on a motion vector detected from an LV image (a motion vector of a main object) and a movement direction detected using the orientation detecting unit 55 (a movement direction of the digital camera 100). In the second embodiment, an example in which the user designates a direction related to the reference direction D will be described. In addition, in the first embodiment, an example in which both a horizontal reference indicator and a vertical reference indicator are displayed has been described. In the second embodiment, an example in which only an indicator indicating a center of the detection region in a direction perpendicular to the reference direction D (an indicator on a straight line of the reference direction D that passes through the center of the detection region) among the horizontal reference indicator and the vertical reference indicator will be described.

The blur indicator indicates a blur (a blur of the main object) in the direction perpendicular to the reference direction D by a position and the user changes a movement speed or a movement direction of the digital camera 100 while looking at the blur indicator so as to reduce a magnitude of the blur. The user may sometimes have already determined a direction related to the reference direction D such as a direction of a blur to be reduced or a movement direction of the digital camera 100 in order to reduce the blur. In consideration thereof, in the second embodiment, an example in which the user designates a direction related to the reference direction D will be described. Accordingly, the blur indicator can be displayed so as to indicate the blur that the user desires to reduce and the user can more readily create a desired composition. It should be noted that the direction designated by the user may be the reference direction D or a direction of a blur to be reduced, a movement direction of the digital camera 100, or the like. When the direction of a blur to be reduced, the movement direction of the digital camera 100, or the like is to be designated, a direction perpendicular to the designated direction is to be determined as the reference direction D.

In addition, the user brings the blur indicator close to an indicator indicating the center of the detection region in the direction perpendicular to the reference direction D in order to reduce a blur of the main object. In this case, display of the other indicator that indicates the center of the detection region is not only meaningless but may also impede the creation of a composition by the user. In consideration thereof, in the second embodiment, only an indicator indicating a center of the detection region in a direction perpendicular to the reference direction D among the horizontal reference indicator and the vertical reference indicator will be displayed. Accordingly, the user can more readily create a desired composition.

Figure 6A:
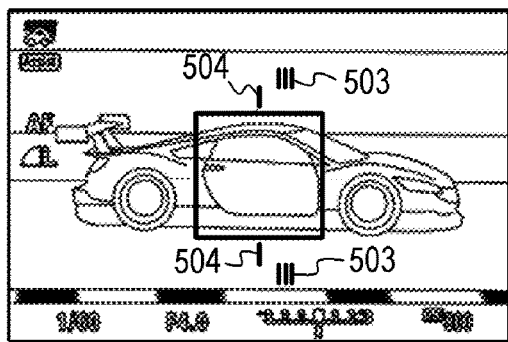
FIGS. 6A and 6B are diagrams showing a display example of an indicator according to a second embodiment.

As an example, a case where a "transverse direction (a left-right direction; a horizontal direction)" is further instructed (selected) by the user as the movement direction of the digital camera 100 when instructing the blur assist mode will be considered. In this case, as shown in FIG. 6A, the horizontal reference indicator 504 is displayed but the vertical reference indicator 505 is not displayed. The blur indicator 503 is displayed so as to indicate a blur in the transverse direction. Accordingly, the user can more readily create a desired composition while viewing the blur indicator 503, the horizontal reference indicator 504, and the like without viewing the vertical reference indicator 505.

Figure 6B:
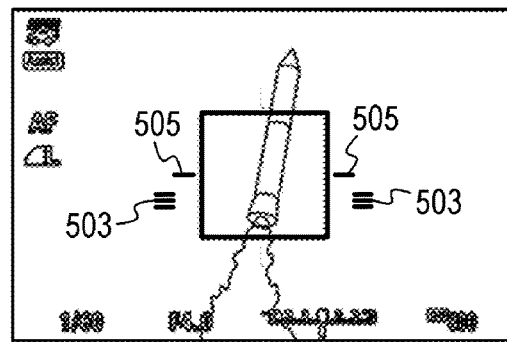

As another example, a case where a "longitudinal direction (an up-down direction; a vertical direction)" is further instructed (selected) by the user as the movement direction of the digital camera 100 when instructing the blur assist mode will be considered. In this case, as shown in FIG. 6B, the vertical reference indicator 505 is displayed but the horizontal reference indicator 504 is not displayed. The blur indicator 503 is displayed so as to indicate a blur in the longitudinal direction. Accordingly, the user can more readily create a desired composition while viewing the blur indicator 503, the vertical reference indicator 505, and the like without viewing the horizontal reference indicator 504.

Electronic devices such as the digital camera 100 may include camera shake correction modes for correcting unintentional camera shake by the user and, as the camera shake correction modes, a panning camera shake correction mode may be provided in addition to an ordinary camera shake correction mode. The camera shake correction mode is a mode in which a camera shake is detected by a vibrating gyroscope and moves a correcting optical system in the vertical direction or the horizontal direction with respect to an optical axis so as to reduce a magnitude of a blur in an image sensing range due to the detected camera shake. In the ordinary camera shake correction mode, during panning, an intentional motion of the digital camera 100 such as a pan may be erroneously detected as a camera shake and an erroneous correction (a movement of the correcting optical system) so as to cancel a change in the image sensing range due to the motion may be performed. Therefore, for example, in the panning camera shake correction mode, when a large motion of the digital camera 100 in the transverse direction or the longitudinal direction is detected, the detected motion is determined as an intentional motion (a pan or a tilt) for panning. In addition, a correction based on a direction of the detected motion (a direction in which the motion is large) is prevented from being performed. Since there are a plurality of modes (the blur assist mode, the panning camera shake correction mode, and the like) as modes related to panning, the plurality of modes are preferably presented to the user in association with each other.

FIG. 7 is a flow chart showing details of photography mode processing performed in the digital camera 100 according to the second embodiment. The processing is realized as the system control unit 50 deploys a program recorded in the nonvolatile memory 56 on the system memory 52 and executes the program. The processing shown in FIG. 7 is started when the digital camera 100 is activated in the photography mode or the system control unit 50 switches to a photography mode. The digital camera 100 repetitively performs the processing shown in FIG. 7 during the photography mode.

In S701, the system control unit 50 displays an LV image and a GUI such as an icon representing a setting state of the digital camera 100 on the display unit 28.

In S702, the system control unit 50 determines whether or not the menu button 81 has been depressed. When the menu button 81 has been depressed, the system control unit 50 advances to S703, but otherwise the system control unit 50 advances to S727.

In S727, the system control unit 50 determines whether or not a blur assist mode is ON (enabled). When the blur assist mode is ON, the system control unit 50 advances to S715, but otherwise the photography mode processing is ended.

In S703, the system control unit 50 displays a menu screen on the display unit 28.

In S704, the system control unit 50 determines whether or not a setting start operation for starting setting of the blur assist mode has been performed on the menu screen. The setting start operation of the blur assist mode is, for example, an operation involving selecting an item of "set blur assist mode" on the menu screen using the four-way key 74 or the touch panel 70a and depressing the SET button 75. When the setting start operation of the blur assist mode has been performed, the system control unit 50 advances to S705, but otherwise the system control unit 50 advances to S728.

In S728, when another menu operation (another operation using the menu screen) is performed, the system control unit 50 performs processing in accordance with the performed menu operation.

In S705, the system control unit 50 displays, on the display unit 28, a blur assist mode setting screen for switching between ON and OFF (enabled and disabled) of the blur assist mode.

In S706, the system control unit 50 determines whether or not an operation for switching the blur assist mode from OFF to ON has been performed on the blur assist mode setting screen. This switching operation is performed using, for example, the four-way key 74, the touch panel 70a, or the SET button 75. When the switching operation for switching the blur assist mode from OFF to ON has been performed, the system control unit 50 advances to S707, but otherwise the system control unit 50 advances to S702. It should be noted that the system control unit 50 hides various screens including the menu screen and the blur assist mode screen as necessary. For example, the system control unit 50 hides a screen in accordance with an operation using the screen or, after displaying a screen, the system control unit 50 hides the screen in accordance with an elapse of a prescribed time without an operation using the screen being performed. In the second embodiment, for the sake of brevity of each processing step in the flow chart shown in FIG. 7, it is assumed that display is controlled such that a state immediately following S701 is created when advancing to S702.

In S707, the system control unit 50 determines whether or not the lens unit 150 mounted to the digital camera 100 supports camera shake correction. When the lens unit 150 supports camera shake correction, the system control unit 50 advances to S708, but otherwise the system control unit 50 advances to S702.

In S708, the system control unit 50 determines whether or not an ordinary camera shake correction mode (mode 1) is set. When the ordinary camera shake correction mode is set, the system control unit 50 advances to S709, but otherwise the system control unit 50 advances to S702.

In S709, the system control unit 50 determines whether or not the lens unit 150 has a panning camera shake correction mode (whether or not a panning camera shake correction mode can be set). When the lens unit 150 has a panning camera shake correction mode (mode 2), the system control unit 50 advances to S710, but otherwise the system control unit 50 advances to S711.

In S710, the system control unit 50 issues a prescribed notification to prompt the user to set the panning camera shake correction mode (mode 2). For example, the system control unit 50 displays, on the display unit 28, a screen on which a message such as "You're recommended to change to Panning Camera Shake Correction Mode" is described.

In S711, the system control unit 50 issues a prescribed notification to prompt the user to release the setting of the camera shake correction mode. For example, the system control unit 50 displays, on the display unit 28, a screen on which a message such as "You're recommended to release Camera Shake Correction Mode" is described.

In S712, the system control unit 50 issues a prescribed notification to prompt the user to set a panning direction (a movement direction of the digital camera 100). For example, the system control unit 50 displays, on the display unit 28, a screen on which a message such as "Set a panning direction" is described. For example, the user can set a transverse direction or a longitudinal direction as the panning direction.

In S713, the system control unit 50 determines whether or not a setting operation for setting a panning direction has been performed. When a setting operation of a panning direction has been performed, the system control unit 50 advances to S714, but otherwise the system control unit 50 advances to S715.

In S714, the system control unit 50 records the panning direction designated by the setting operation of S713 in the system memory 52 (setting of panning direction). For example, the system control unit 50 records a setting value indicating the designated panning direction in the system memory 52. When a panning direction has not been set, the system memory 52 stores a setting value indicating "no direction" as the setting value of the panning direction.

In S715, the system control unit 50 displays a detection region on the display unit 28.

In S716, the system control unit 50 determines whether or not a movement operation of the detection region has been performed. When a movement operation of the detection region has been performed, the system control unit 50 advances to S717, but otherwise the system control unit 50 advances to S718.

In S717, the system control unit 50 moves the detection region in accordance with the movement operation.

In S718, the system control unit 50 determines whether or not a photography preparation operation has been performed. When a photography preparation operation has been performed, the system control unit 50 advances to S719, but otherwise the system control unit 50 advances to S716.

In S719, the system control unit 50 performs the photography preparation processing.

In S720, the system control unit 50 displays one or more indicators for assisting panning on the display unit 28 (indicator display processing). The indicator display processing is approximately the same as in the first embodiment (FIG. 4). However, when the panning direction has been set, in S404, the system control unit 50 determines a component of a motion vector in the panning direction (a motion vector of the main object in an LV image) as the motion component N. In S405, the system control unit 50 determines a direction perpendicular to the panning direction as the reference direction D. In addition, in S406, the system control unit 50 only displays an indicator indicating a center of the detection region in the panning direction among the horizontal reference indicator and the vertical reference indicator. It is needless to say that the system control unit 50 also displays the blur indicator.

In S721, the system control unit 50 determines whether or not a photography operation has been performed. When a photography operation has been performed, the system control unit 50 advances to S722, but otherwise the system control unit 50 advances to S723.

In S722, the system control unit 50 performs the photography processing.

In S723, the system control unit 50 determines whether or not the photography preparation operation has been released. When the photography preparation operation has been released, the system control unit 50 advances to S724, but otherwise the system control unit 50 advances to S721.

In S724, the system control unit 50 determines whether or not another operation has been performed. When another operation has been performed, the system control unit 50 advances to S725, but otherwise the system control unit 50 advances to S716.

In S725, the system control unit 50 determines whether or not the operation in S724 is an end operation of photography mode processing. When the operation is an end operation, the system control unit 50 ends the photography mode processing, but otherwise the system control unit 50 advances to S726.

In S726, the system control unit 50 performs processing in accordance with the operation in S724.

According to the second embodiment described above, a direction related to the reference direction D is designated by the user. Accordingly, the blur indicator can be displayed so as to indicate the blur that the user desires to reduce and the user can more readily create a desired composition. In addition, according to the second embodiment, only an indicator indicating a center of the detection region in a direction perpendicular to the reference direction D among the horizontal reference indicator and the vertical reference indicator will be displayed. Accordingly, the user can more readily create a desired composition.

Third Embodiment

A third embodiment of the present invention will be described. In the first embodiment, an example of determining the indicator distance L in accordance with a size of a main object present in a detection region has been described. In the third embodiment, an example in which the user designates the indicator distance L will be described.

As described in the first embodiment, an indicator is preferably displayed so as not to overlap with the main object. In consideration thereof, in the third embodiment, the indicator distance L is to be designated (set) by the user. Accordingly, a situation where an indicator overlaps with the main object can be more reliably suppressed and the display of the indicator can be adjusted to suit the user's preferences. The operation for designating the indicator distance L is performed using, for example, the four-way key 74, the touch panel 70a, or the SET button 75.

Figure 8:
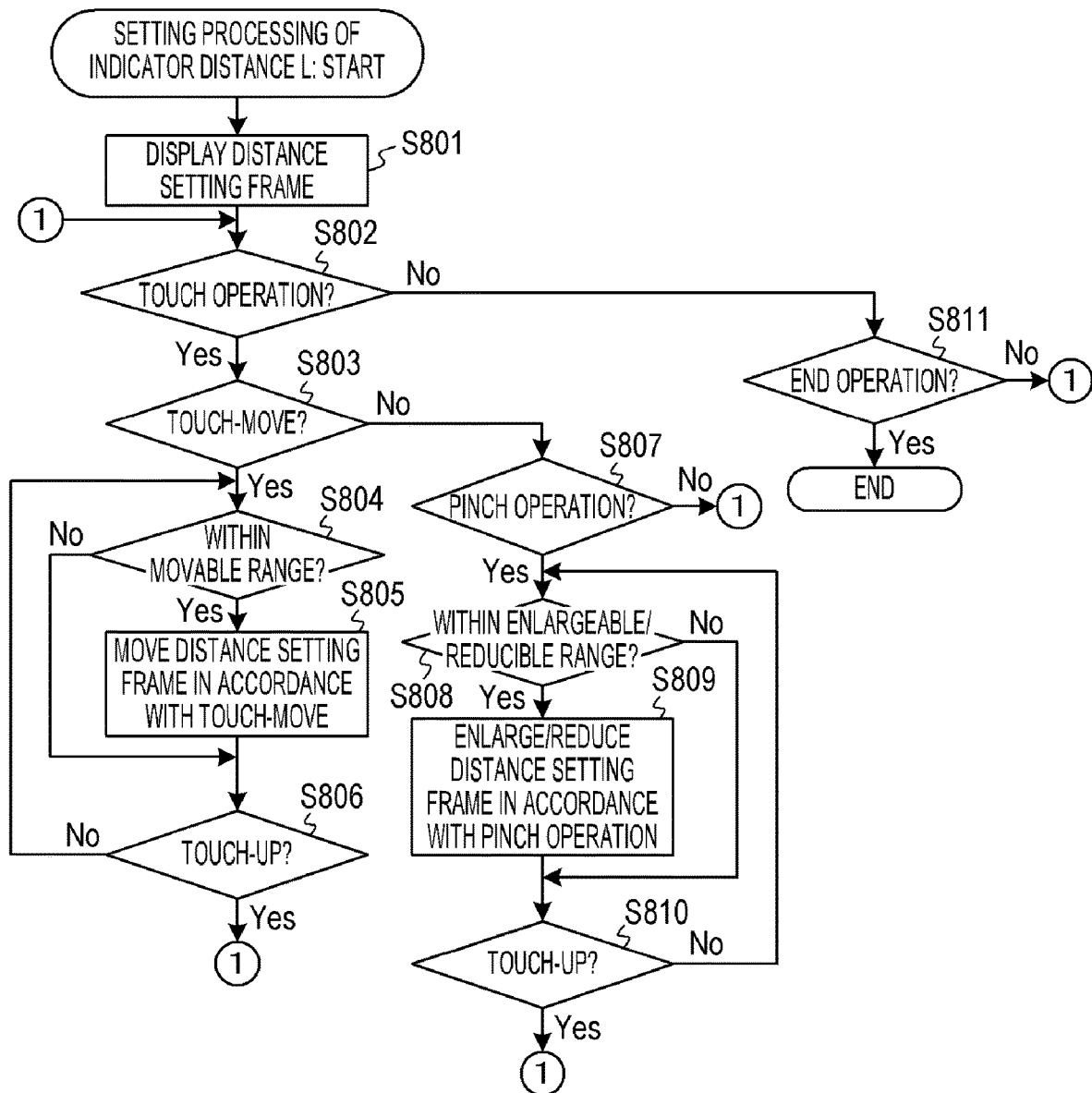
FIG. 8 is a flow chart showing setting processing according to a third embodiment.

FIG. 8 is a flow chart showing details of setting processing for setting (changing) the indicator distance L. The processing is realized as the system control unit 50 deploys a program recorded in the nonvolatile memory 56 on the system memory 52 and executes the program. The processing in FIG. 8 starts when an operation to start the setting processing of the indicator distance L is performed. The operation to start the setting processing of the indicator distance L is, for example, an operation involving selecting an item of "set indicator distance" on the menu screen using the four-way key 74 or the touch panel 70a and depressing the SET button 75.

In S801, the system control unit 50 displays, on the display unit 28, a distance setting frame for setting the indicator distance L. For example, the system control unit 50 displays the distance setting frame of the indicator distance L so as to indicate a same region as the detection region (at a same position and in a same size as the detection region). It should be noted that an item for setting the indicator distance L is not limited to the distance setting frame and may be a dialog for designating a distance or the like.

In S802, the system control unit 50 determines whether or not a touch operation with respect to the touch panel 70a has been performed. When a touch operation has been performed, the system control unit 50 advances to S803, but otherwise the system control unit 50 advances to S811.

In S811, the system control unit 50 determines whether or not an end operation (an end instruction) for ending the setting processing of the indicator distance L has been performed. When the end operation is performed, the system control unit 50 ends the setting processing of the indicator distance L, but otherwise the system control unit 50 advances to S802. For example, the system control unit 50 determines that an end operation has been performed when an operation of turning off power of the digital camera 100 has been performed and ends the setting processing of the indicator distance L. When ending the setting processing of the indicator distance L, the system control unit 50 sets the indicator distance L based on the distance setting frame. For example, the system control unit 50 records a distance from the detection region (for example, the center of the detection region) to an end (a frame line) of the distance setting frame as the indicator distance L in the system memory 52 or the nonvolatile memory 56. In this case, in S402 shown in FIG. 4, the system control unit 50 performs processing for acquiring the set indicator distance (a main object size need not be detected in S401).

In S803, the system control unit 50 determines whether or not the touch operation in S802 is a touch-move. When the touch operation is a touch-move, the system control unit 50 advances to S804, but otherwise the system control unit 50 advances to S807.

In S804, the system control unit 50 determines whether or not a movement (a movement amount and a movement direction) of the touch position is within a movable range. The movable range refers to a range in which the distance setting frame can be moved in accordance with a movement of the touch position. For example, the movable range is a range in which the end of the distance setting frame is positioned outside the detection region (the end of the distance setting frame stays outside the detection region) when the distance setting frame is moved in accordance with a movement of the touch position. When the movement of the touch position is within the movable range, the system control unit 50 advances to S805, but otherwise the system control unit 50 advances to S806.

In S805, the system control unit 50 moves the distance setting frame in accordance with the movement of the touch position. For example, the system control unit 50 moves the distance setting frame by a same movement amount as the movement amount of the touch position and in a same movement direction as the movement direction of the touch position. Accordingly, distances from the detection region (for example, the center of the detection region) to the end of the distance setting frame can be differentiated among a plurality of directions such as up, down, left, and right, and the indicator distance L can be set for each of the plurality of directions.

In S806, the system control unit 50 determines whether or not the touch-move has ended (whether or not a touch-up from the touch panel 70a has been performed). When the touch-move has ended, the system control unit 50 advances to S802, but otherwise the system control unit 50 advances to S804.

In S807, the system control unit 50 determines whether or not the touch operation in S802 is a pinch operation (a pinch-out or a pinch-in). When the touch operation is a pinch operation, the system control unit 50 advances to S808, but otherwise the system control unit 50 advances to S802.

In S808, the system control unit 50 determines whether or not a change (a change amount and a change direction) in an interval between two touch positions in the pinch operation is within an enlargeable/reducible range. The enlargeable/reducible range refers to a range in which the distance setting frame can be enlarged/reduced in accordance with a change in the interval between the touch positions. For example, the enlargeable/reducible range is a range in which the end of the distance setting frame is positioned outside the detection region (the end of the distance setting frame stays outside the detection region) when the distance setting frame is enlarged or reduced in accordance with a change in the interval between the touch positions. When the change in the interval between the touch positions is within the enlargeable/reducible range, the system control unit 50 advances to S809, but otherwise the system control unit 50 advances to S810.

In S809, the system control unit 50 enlarges or reduces the distance setting frame in accordance with the change in the interval between the touch positions. For example, the system control unit 50 enlarges or reduces the distance setting frame by a same change amount as the change amount of the interval between the touch positions and in a same change direction as the change direction of the interval between the touch positions. Alternatively, without taking the change direction of the interval between the touch positions into consideration, the distance setting frame may be enlarged or reduced without changing the position of the distance setting frame in accordance with the change amount of the interval between the touch positions. However, by taking the change direction of the interval between the touch positions into consideration, distances from the detection region (for example, the center of the detection region) to the end of the distance setting frame can be differentiated among a plurality of directions such as up, down, left, and right, and the indicator distance L can be set for each of the plurality of directions.

In S810, the system control unit 50 determines whether or not the pinch operation has ended (whether or not a touch-up from the touch panel 70a has been performed). When the pinch operation has ended, the system control unit 50 advances to S802, but otherwise the system control unit 50 advances to S808.

According to the third embodiment described above, the indicator distance L is designated (set) by the user. Accordingly, a situation where an indicator overlaps with the main object can be more reliably suppressed and the display of the indicator can be adjusted to suit the user's preferences. Consequently, the user can more preferably create a desired composition.

Fourth Embodiment

A fourth embodiment of the present invention will be described. In the fourth embodiment, an example in which a region (an AF region) where automatic focusing is performed is used as a detection region will be described.

As described in the first embodiment, in order to perform panning of an image in which a main object is stationary in the detection region, the detection region is set at a position where the user desires to arrange the main object. At this point, many users consider bringing the main object in the detection region into focus. In addition, an AF region is set at a position that the user desires to bring into focus. In consideration thereof, in the fourth embodiment, the AF region is also used as the detection region (the AF region doubles as the detection region). Accordingly, the hassle of the user having to set the detection region separately from the AF region can be eliminated and convenience is improved.

According to the fourth embodiment described above, the AF region doubles as the detection region. Accordingly, the hassle of the user having to set the detection region separately from the AF region can be eliminated and convenience is improved. Consequently, the user can more preferably create a desired composition.

While the present invention has been described in detail based on preferred embodiments thereof, the present invention is not limited to the specific embodiments and various modes without departing from the scope of the invention are also included in the present invention. Furthermore, the respective embodiments described above simply represent examples of the present invention and the embodiments can also be combined with other embodiments.

In addition, while the various controls described above as controls to be performed by the system control unit 50 may be carried out by one piece of hardware, or a plurality of pieces of hardware (for example, a plurality of processors or circuits) may control an entire apparatus by sharing processing. Furthermore, while an example in which the present invention is applied to a digital camera (an image sensing apparatus) has been described in the embodiments presented above, the present invention is not limited to this example and can be applied to any electronic device that enables control related to photography such as panning to be performed (any electronic device having an image sensing control function). For example, the present invention can be applied to a personal computer, a PDA, a mobile phone terminal, a mobile image viewer, a printer apparatus, a digital photo frame, a music player, a game device, an electronic book reader, a video player, and the like. The present invention can also be applied to a display apparatus (including a projection apparatus), a tablet terminal, a smartphone, an AI speaker, a domestic electrical appliance, a vehicle-mounted apparatus, medical equipment, and the like.

According to the present disclosure, a user can readily create a composition that captures a stationary main object at a position desired by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-149457, filed on Sep. 4, 2020, which is hereby incorporated by reference herein in its entirety.

What is claimed is:

1. An imaging device comprising:
a shutter button; and
a memory and at least one processor which function as:
an acquiring unit configured to acquire an image by image sensing processing; and
a control unit configured to perform, in a case where a setting related to panning is enabled, control to
detect a motion of a main object from the image acquired by the acquiring unit, and
display an indicator indicating a blur of the main object in a direction of the panning for assisting the panning, based on the detected motion of the main object, so that the indicator is superimposed and displayed on the image, wherein
the control unit performs control to superimpose and display on the image the indicator indicating the blur in the direction of the panning based on the detected motion of the main object while a predetermined operation is performed on the shutter button.

2. The imaging device according to claim 1, wherein the image is a live view image that is sequentially acquired by the image sensing processing.

3. The imaging device according to claim 1, wherein the memory and the at least one processor further function as a setting unit configured to switch between enabled and disabled of the setting related to the panning.

4. The imaging device according to claim 3, wherein the setting unit sets a part of the image acquired by the acquiring unit as a specific region for detecting the main object, and
the control unit performs control to
detect the motion of the main object included in the specific region for detecting the main object, and
display the indicator indicating the blur of the main object in the direction of the panning, based on the detected motion of the main object, so that the indicator is superimposed and displayed at a position on the image based on the specific region for detecting the main object.

5. The imaging device according to claim 4, wherein the setting unit sets the specific region for detecting the main object in a case where the setting related to the panning is enabled.

6. The imaging device according to claim 4, wherein the control unit performs control to superimpose and display the indicator outside the specific region for detecting the main object.

7. The imaging device according to claim 4, wherein the setting unit is capable of setting a distance from the specific region for detecting the main object to a display position of the indicator.

8. The imaging device according to claim 3, wherein the setting unit is capable of setting a pan direction or a tilt direction as a direction of the panning, and
the control unit performs control to detect the motion of the main object in the direction of the panning set by the setting unit, and superimpose and display on the image the indicator based on the detected motion of the main object.

9. The imaging device according to claim 1, wherein the control unit performs control to superimpose and display on the image the indicator so that the indicator in different colors and different display positions in accordance with the detected motion of the main object.

10. The imaging device according to claim 1, wherein the control unit performs control to superimpose and display the indicator on the image regardless of whether the main object is blurred or not in the direction of the panning.

11. The imaging device according to claim 1, wherein the control unit performs control to superimpose and display the indicator only for the main object.

12. The imaging device according to claim 1, further comprising an image sensor configured to perform the image sensing processing, wherein
the acquiring unit acquires the image from the image sensor.

13. The imaging device according to claim 1, wherein in a case where the setting related to the panning is enabled, if camera shake correction for the panning is settable, the control unit perform control to issue a predetermined notification to prompt a user to set the camera shake correction for the panning.

14. The imaging device according to claim 1, wherein in a case where the setting related to the panning is enabled, if normal camera shake correction different from for camera shake correction for the panning is set, the control unit perform control to issue a predetermined notification to prompt a user to release the normal camera shake correction.

15. The imaging device according to claim 1, wherein the panning is photography to obtain an image in which a background is blurred in the direction of the panning and the main object is not blurred in the direction of the panning, the photography being performed while moving the imaging device in a movement direction of the main object.

16. The imaging device according to claim 1, wherein the predetermined operation on the shutter button is a half-press operation on the shutter button.

17. The imaging device according to claim 1, wherein the control unit performs control not to display the indicator indicating the blur based on the detected motion of the main object while an operation is not performed on the shutter button.

18. A control method of an imaging device including a shutter button, comprising:
acquiring an image by image sensing processing; and
performing, in a case where a setting related to panning is enabled, control to
detect a motion of a main object from the acquired image, and
display an indicator indicating a blur of the main object in a direction of the panning for assisting the panning, based on the detected motion of the main object, so that the indicator is superimposed and displayed on the image, wherein
control is performed to superimpose and display on the image the indicator indicating the blur in the direction of the panning based on the detected motion of the main object while a predetermined operation is performed on the shutter button.

19. A non-transitory computer readable medium that stores a program, wherein the program causes a computer to execute a control method of an imaging device including a shutter button, the control method comprising:
acquiring an image by image sensing processing; and
performing, in a case where a setting related to panning is enabled, control to
detect a motion of a main object from the acquired image, and
display an indicator indicating a blur of the main object in a direction of the panning for assisting the panning, based on the detected motion of the main object, so that the indicator is superimposed and displayed on the image, wherein
control is performed to superimpose and display on the image the indicator indicating the blur in the direction of the panning based on the detected motion of the main object while a predetermined operation is performed on the shutter button.

* * * * *